United States Patent [19]

Klemen et al.

[11] Patent Number: 4,981,198

[45] Date of Patent: Jan. 1, 1991

[54] HYDRAULIC RETARDER AND CONTROL

[75] Inventors: Donald Klemen, Carmel; James P. Ordo, Plainfield; John R. Bitner, Arlington, all of Ind.

[73] Assignee: General Motors Corporation, Detroit, Mich.

[21] Appl. No.: 450,778

[22] Filed: Dec. 14, 1989

[51] Int. Cl.⁵ ............................................ F16D 57/06
[52] U.S. Cl. .................................. 188/294; 192/4 B; 303/11
[58] Field of Search ........... 188/290, 294, 296, 264 E; 192/4 B, 12 A, 12 C, 13 A; 303/11

[56] References Cited

U.S. PATENT DOCUMENTS

| | | | |
|---|---|---|---|
| 3,888,335 | 6/1975 | Hanke | 188/290 |
| 3,931,870 | 1/1976 | Memmer | 188/296 |
| 3,987,874 | 10/1976 | Fuehrer et al. | 188/296 |
| 4,881,625 | 11/1989 | Redelman | 188/290 |

*Primary Examiner*—Duane A. Reger
*Attorney, Agent, or Firm*—Donald F. Scherer

[57] ABSTRACT

A hydraulic retarder has a control valve mechanism with a regulator valve for controlling the pressure of the fluid delivered to the retarder as a function of operator demand and an operating parameter of the retarder. The regulator valve has an opening pressure bias that is determined by a retarder signal valve which is responsive to an operator input and a closing pressure bias determined by the outlet pressure of the retarder.

3 Claims, 1 Drawing Sheet

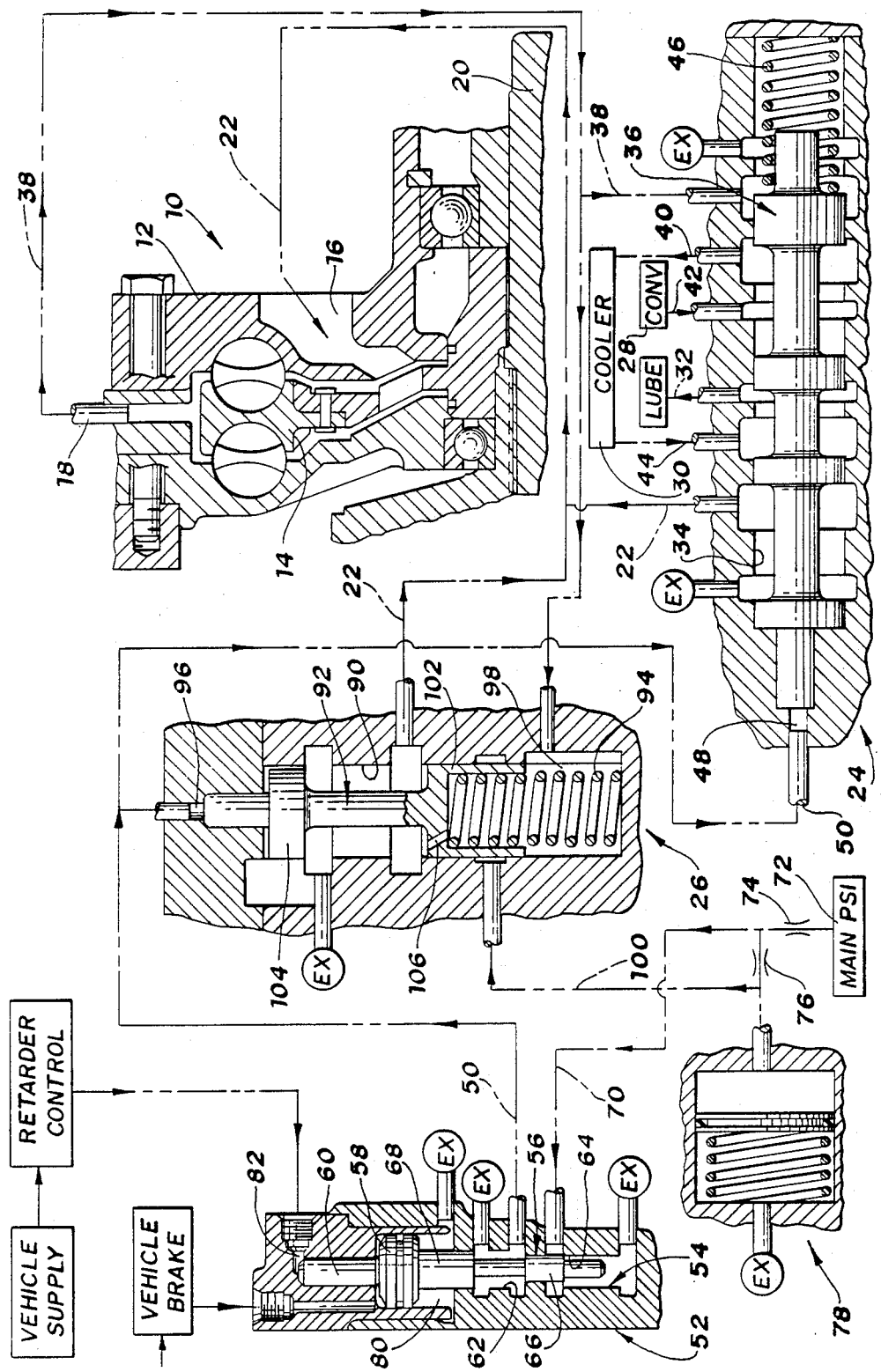

HYDRAULIC RETARDER AND CONTROL

BACKGROUND OF THE INVENTION

This invention relates to retarder controls and more particularly to controls for providing a variable inlet pressure control for a hydraulic retarder.

SUMMARY OF THE INVENTION

It is an object of this invention to provide an improved hydraulic retarder and control, wherein the inlet pressure to the retarder is controlled as a function of operator demand and an operating parameter of the retarder.

It is another object of this invention to provide an improved hydraulic retarder and control, wherein a pressure regulator valve limits the inlet pressure to the hydraulic retarder in response to a bias pressure proportional to the outlet pressure of the hydraulic retarder.

It is a further object of this invention to provide an improved control for a hydraulic retarder as described in the preceding object, wherein the pressure regulator also has an initial closing bias pressure proportional to the hydraulic retarder inlet pressure.

It is a still further object of the present invention to provide an improved hydraulic retarder and control, wherein a pressure regulator valve is selectively operable to control the inlet pressure to the retarder, and wherein the regulator valve has an opening bias pressure proportional to an operating parameter of the hydraulic retarder.

It is yet another object of the present invention to provide an improved hydraulic retarder and control, wherein the control has a signal valve for providing a variable input bias pressure to a regulator valve which controls the inlet pressure to the retarder, and further wherein the signal valve is responsive to an operator brake operation to control the input bias between a minimum value and a maximum value, and also wherein the maximum value is attained prior the engagement of the vehicle friction brakes.

These and other objects and advantages will be more apparent from the following description and drawing.

DESCRIPTION OF THE DRAWING

The drawing is a schematic representation of a hydraulic retarder and hydraulic control mechanism incorporating the present invention.

DESCRIPTION OF AN EXEMPLARY EMBODIMENT

A conventional hydraulic retarder 10 has a stator portion 12, a rotor portion 14, a retarder inlet port 16 and a retarder outlet port 18. The retarder 10 is effective, when pressurized, to retard the rotary motion of a shaft 20 which may be either an input shaft or an output shaft of a conventional transmission, not shown. The retarder inlet port 16 is connected to receive hydraulic fluid through a retarder inlet or feed passage 22 which is connected with a retarder flow control valve 24 and a retarder pressure regulator valve 26. The flow control valve 24 is a conventional control valve which is used to control the fluid from a conventional hydraulic torque converter 28, to and from a conventional cooler 30 and to a lubrication delivery passage 32.

The flow control valve 24 has a valve bore 34 in which is slidably disposed a multi-land valve spool 36. The valve bore 34 is in fluid communication with a retarder outlet passage 38, a cooler inlet passage 40, a converter outlet passage 42, the lubrication delivery passage 32, a cooler outlet passage 44, the retarder inlet passage 22 and a pair of exhaust passages. The valve 24 also includes a bias spring 46 and a control chamber 48. The control chamber 48 is connected with an opening bias passage 50 which when pressurized will move the spool 36 against the bias spring 46 to a pressure set position.

In the spring set position shown, the retarder outlet passage 38 is connected to exhaust, the converter outlet passage 42 is connected to the cooler inlet passage 40, the cooler outlet passage 44 is connected to the lubrication passage 32 and the retarder inlet passage 22 is connected with exhaust. Thus, in the spring set position, the retarder 10 cannot be pressurized and will not impose a braking load on the shaft 20. In the pressure set position, the retarder flow valve 24 is effective to connect the retarder inlet passage 22 with the cooler outlet passage 44, the retarder outlet passage 38 to the cooler inlet passage 40, and the converter outlet passage 42 to the lubrication passage 32. Thus, in the pressure set position, the retarder flow valve 24 will direct fluid from the retarder 10 to the cooler 30 and back to the retarder 10.

The fluid pressure in the passage 50 is determined by a retarder signal valve 52 which includes a valve bore 54, a valve spool 56, a brake control plug 58 and a retard control plug 60. The bore 54 is a step diameter bore having a large diameter portion 62 and a small diameter portion 64. The valve spool 56 has a small diameter land 66 slidably disposed in the portion 64 and a large diameter land portion 68 slidably disposed in the portion 62. The space between the lands 66 and 68 is in continuous fluid communication with the passage 50, and selectively and alternatively, is in fluid communication with a main pressure passage 70 and an exhaust passage. The main pressure passage 70 is in fluid communication with a source of fluid pressure 72, such as a conventional control pump, through an orifice or restriction 74. The passage 70 is also in continuous communication through an orifice or restriction 76 with a conventional accumulator 78.

Fluid pressure from passage 70 will operate on the differential area between the lands 66 and 68 to urge the valve spool 56 upward, as viewed in the drawing, until the exhaust passage is opened. The pressure level between the lands 66 and 68 will be maintained at a value to control the valve spool 56 at this position. The brake control plug 58 has disposed adjacent thereto a control chamber 80 which is selectively pressurized by actuation of the vehicle brakes by the vehicle operator. Pressure in chamber 80 will impose a downward bias on the valve spool 56 resulting in an increase in pressure between the lands 66 and 68 and therefore an increase in the pressure in passage 50. Thus, the pressure in passage 50 can be controlled to an amount proportional to the pressure in the vehicle brake system. In the preferred embodiment of the invention, the pressure in the chamber 80 can be in the range of zero (0) to seven (7) psi prior to the vehicle brakes being engaged. In this range of brake pressure, the pressure in passage 50 will be controlled in the range of zero (0) to 160 psi. The pressure proportions are determined by the diameter of the plug 58 and the differential area between the lands 66 and 68.

This range of pressure allows the operator to control vehicle deceleration through the retarder prior the actual engagement of the service brakes. Therefore, if the vehicle deceleration is sufficient, the service brakes will not have to be applied. If increased deceleration is desired, the operator will apply more force to the brake control which will result in the service brakes being applied in addition to the retarder operation. Under these conditions, the retarder is employed by the operator in all braking instances. At times, the operator will desire to use the retarder only for controlling the vehicle speed. The plug 60 is provided for such instances. When retarder action is requested by the operator, a chamber 82 adjacent the plug 60 will be pressurized. This imposes a downward bias on the valve spool 56 which is countered by an increase in pressure between the lands 66 and 68. When retarder operation only is requested, a fixed pressure is applied to the plug 60 which will result in the pressure in passage 50 being established at the maximum value of 160 psi.

The request for retardation is imposed on the regulator valve 26 and the flow control valve 24 through the passage 50. As described above, the flow control valve 24 is operable to direct fluid in a substantially closed circuit which includes the retarder 10. The inlet pressure to the retarder, during retard operation, is established and controlled by the regulator valve 26 which includes a valve bore 90, a valve spool 92, a bias spring 94, an opening bias chamber 96 and a closing bias chamber 98. The valve bore 90 is in communication with the retarder inlet passage 22, a pressure feed passage 100 and an exhaust passage. The opening bias chamber 96 is in continuous communication with the passage 50 and the closing bias chamber is in communication with the retarder outlet passage 38. In the alternative, the closing bias chamber 98 can be maintained in communication with the retarder inlet passage 22. However, it is believed that a truer retardation pressure is obtained if the bias is proportional to the outlet pressure of the retarder 10.

The valve spool 92 has spaced lands 102 and 104 which are slidably disposed in the bore 90 and are positioned to provide selective communication between the retarder inlet passage 22 and exhaust, in the spring set position shown, and between the inlet passage 22 and the pressure feed passage 100, in the pressure set position. The pressure set position is established during retardation by the pressure in the passage 50 which operates on the end of the valve spool 92 in the chamber 96. Pressure in the chamber 96 imposes an opening bias on the valve spool 92 thereby permitting communication between the pressure feed passage 100 and the valve bore 90. During the initial opening of the regulator valve 26, the pressure in the valve bore 90 between the lands 102 and 104 is directed through a restricted passage 106 formed in the valve spool 92. This passage 106 will admit fluid to the closing bias chamber 98 to prevent "overshoot" of the valve spool 92. In other words, the initial opening speed of the valve is controlled.

During retard operation, the valve 26 opens to permit high pressure fluid from the accumulator 78 to enter and charge the retarder 10. Simultaneously, the flow control valve 24 is manipulated to redirect fluid from the retarder outlet 18 to the retarder inlet 16 thereby reducing the inlet flow requirements of the retarder 10. When the retarder 10 reaches operating pressure, the closing bias in chamber 98 will move the valve spool 92 against the opening bias and reduce the amount of inlet flow supplied by the accumulator 78. The accumulator 78 will only supply fluid as required by leakage from the system. As this flow requirement is less than the amount of fluid that can be supplied by the source 72 to the accumulator 78, the accumulator 78 will be fully recharged in preparation for the next retardation request.

By selective control of the vehicle operating parameters; i.e., retarder control, brake control or throttle control, the opening bias pressure at regulator valve 26 is controlled. The retarder control and throttle control will generally be used to establish a fixed bias pressure and therefor substantially constant retarder inlet and outlet pressures. The brake control will generally be utilized to establish a range of bias pressures, as explained above, to permit a more controlled use of the retarder and to extend the life of the service brakes. The retarder control can also provide a variable bias, if desired. The control inputs to the valves may generate the control pressure by way of solenoid valves, if desired. The solenoid valves can be controlled in a well known manner to respond to electrical signals to establish the desired output pressure signals.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydraulic retarder and control system in a vehicle having an engine throttle, a cooler and friction brake actuator means, said control system comprising: a source of pressure, a flow valve for selectively directing fluid to and from the cooler and to and from inlet and return ports of the hydraulic retarder; an accumulator in fluid communication with said source of pressure; a pressure regulator valve in fluid communication with said retarder, said pressure source and said accumulator for selectively controlling the fluid pressure to the retarder; and signal valve means responsive to a vehicle operating parameter for connecting said source of fluid pressure to an opening bias means on said pressure regulator valve for connecting the accumulator and the pressure source with the inlet of said retarder and to said flow valve for directing fluid from said retarder to said cooler and from said cooler to the inlet of said retarder; and closing bias means responsive to a retarder fluid pressure signal for controlling the pressure regulator valve in a closing direction, said regulator valve being operable in response to pressure at said opening and closing bias means to connect said accumulator with said retarder to initiate filling of said retarder, and said regulator valve being operable to discontinue fluid flow from said accumulator to said retarder when the retarder pressure signal is at and above a pressure level determined by the pressure at the opening and closing bias means on said regulator valve.

2. A hydraulic retarder and control system in a vehicle having a retarder actuator, a cooler and a friction brake operator, said control system comprising: a source of pressure, a flow valve for selectively directing fluid to and from the cooler and to and from inlet and return ports of the hydraulic retarder; an accumulator in fluid communication with said source of pressure; a pressure regulator valve in fluid communication with said retarder, said pressure source and said accumulator for selectively controlling the fluid pressure to the retarder; and signal valve means responsive to said retarder actuator and said friction brake operator for connecting said source of fluid pressure to an opening bias means on said pressure regulator valve for connecting the accumulator and the pressure source with the inlet of said retarder and to said flow valve and for directing fluid from said retarder to said cooler and from said cooler to the inlet of said retarder; and closing bias means on said regulator valve responsive to a retarder fluid return pressure signal for urging the pressure regulator valve in a closing direction, said regulator valve being operable in response to pressure at said opening and closing bias means to connect said accumulator with said retarder to initiate filling of said retarder, and said regulator valve being operable to discontinue fluid flow from said accumulator to said retarder when the retarder fluid return pressure signal is at and above a pressure level determined by the pressure at the opening and closing bias means.

3. A hydraulic retarder and control system in a vehicle having an engine throttle, an operator retarder control, a cooler and friction brake actuator means, said control system comprising: a source of pressure, a flow valve for selectively directing fluid to and from the cooler and to and from inlet and return ports of the hydraulic retarder; an accumulator in fluid communication with said source of pressure; a pressure regulator valve in fluid communication with said retarder, said pressure source and said accumulator for selectively controlling the fluid pressure to the retarder; and signal valve means responsive to said friction brake actuator means for connecting said source of fluid pressure to an opening bias means on said pressure regulator valve at a pressure level determined by the friction brake actuator means for connecting the accumulator and the pressure source with the inlet of said retarder and to said flow valve and for directing fluid from said retarder to said cooler and from said cooler to the inlet of said retarder; and closing bias means responsive to a retarder fluid pressure signal for controlling the pressure regulator valve in a closing direction, said regulator valve being operable in response to pressure at said opening and closing bias means to connect said accumulator with said retarder to initiate filling of said retarder, and said regulator valve being operable to discontinue fluid flow from said accumulator to said retarder when the retarder pressure signal is at and above a pressure level determined by the pressure at each of the opening bias means the closing bias means.

* * * * *